(12) United States Patent
Kobayashi et al.

(10) Patent No.: US 7,612,304 B2
(45) Date of Patent: Nov. 3, 2009

(54) LOAD MEASURING MECHANISM

(75) Inventors: Masaaki Kobayashi, Tokyo (JP); Toshitaka Harikai, Tokyo (JP); Masaru Ikeshima, Tokyo (JP)

(73) Assignee: Shinko Denshi Company Limited, Tokyo (JP)

( * ) Notice: Subject to any disclaimer, the term of this patent is extended or adjusted under 35 U.S.C. 154(b) by 758 days.

(21) Appl. No.: 10/544,258

(22) PCT Filed: Jul. 30, 2003

(86) PCT No.: PCT/JP03/09659

§ 371 (c)(1),
(2), (4) Date: Mar. 29, 2006

(87) PCT Pub. No.: WO2004/070328

PCT Pub. Date: Aug. 19, 2004

(65) Prior Publication Data

US 2007/0017711 A1 Jan. 25, 2007

(30) Foreign Application Priority Data

Feb. 7, 2003 (JP) ............................. 2003-030903

(51) Int. Cl.
G01G 7/00 (2006.01)
(52) U.S. Cl. .................. 177/229; 73/1.13; 73/1.15; 73/862.622; 73/862.634
(58) Field of Classification Search ................ 177/156, 177/164, 211, 229; 73/1.13, 1.15, 862.622, 73/862.633, 862.634
See application file for complete search history.

(56) References Cited

U.S. PATENT DOCUMENTS 3,261,046 A * 7/1966 Massaglia ................... 15/3.1
4,485,881 A 12/1984 Tramposch et al.

(Continued)

FOREIGN PATENT DOCUMENTS

JP 60-78328 A 5/1985

(Continued)

Primary Examiner—Randy W Gibson
(74) Attorney, Agent, or Firm—Frishauf, Holtz, Goodman & Chick, P.C.

(57) ABSTRACT

In a load measuring mechanism capable of easily adjusting a positional deviation error by means of a positional deviation error adjusting portion, a load receiving portion 3 is connected to a substrate portion 2 by means of parallel link portions 4a, 4b via flexures 5a-5d, a finely deformable portion 2a is provided at an upper portion of the substrate portion 2, and the flexure 5a is coupled with the deformable portion 2a. Positional deviation error adjusting portions 10 are provided on both sides of the substrate portion 2, a base portion 12 of the positional deviation error adjusting portion 10 is connected to a first lever 13 via a fulcrum 15, and the first lever 13 is coupled with a second lever 14 via a flexible portion 16. When a distance between the base portion 12 and the first lever 13 is increased by rotating an adjusting bolt 11, this displacement is transferred to an end 14a of the second lever 14. Then, a deviation force is applied to the flexure 5a by means of an end 14b of the second lever 14 secured between the deformable portion 2a and the flexure 5a such that a height of the flexure 5a is changed to adjust the positional deviation error.

7 Claims, 3 Drawing Sheets

U.S. PATENT DOCUMENTS

| | | | |
|---|---|---|---|
| 4,606,421 A | | 8/1986 | Schroeder |
| 4,653,599 A | | 3/1987 | Johnson |
| 4,655,306 A | * | 4/1987 | Saner .................. 177/229 |
| 4,679,642 A | | 7/1987 | Brock et al. |
| 4,697,658 A | | 10/1987 | Scheffer et al. |
| 5,205,369 A | * | 4/1993 | Neeleman ............ 177/229 |
| 5,250,762 A | * | 10/1993 | Gustafsson et al. ...... 177/244 |
| 5,307,165 A | * | 4/1994 | Kawashima et al. ...... 348/441 |
| 5,340,951 A | | 8/1994 | Hungerbuhler et al. |
| 5,604,336 A | * | 2/1997 | Johnson ............... 177/229 |
| 6,326,562 B1 | * | 12/2001 | Burkhard et al. ...... 177/210 EM |
| 7,220,924 B2 | * | 5/2007 | Burkhard .............. 177/229 |
| 2005/0121237 A1 | * | 6/2005 | Kusumoto ............. 177/229 |

FOREIGN PATENT DOCUMENTS

| | | | | |
|---|---|---|---|---|
| JP | 1-302124 A | | 12/1989 | |
| JP | 5-196492 A | | 8/1993 | |
| JP | 6-265397 A | | 9/1994 | |
| JP | 07-055596 A | * | 3/1995 | |
| JP | 8-201155 A | | 8/1996 | |
| JP | 2000-121421 A | | 4/2000 | |

* cited by examiner

LOAD MEASURING MECHANISM

This application is a U.S. National Phase Application under 35 USC 371 of International Application PCT/JP2003/009659 filed Jul. 30, 2003.

FIELD OF THE INVENTION

The present invention relates to a load measuring mechanism, in which a positional deviation error due to a deviation in a position at which a load to be measured is applied to a weighing apparatus (four corners error) can be easily adjusted or corrected.

BACKGROUND OF THE INVENTION

When a load is measured by means of a load cell having a Roberval mechanism, it is inevitable to produce a positional deviation error.

Such a positional deviation error differs from respective load converting devices, and therefore it is necessary to adjust such an error in respective load converting devices. In practice, at least one of flexures supporting a parallel link member is grounded or at least one height adjusting screw is operated.

However, such adjustments require a skill. Moreover, in case of grinding a flexure, it is necessary to wait until a heat generated by friction during the grinding has been dissipated. In case of using the height adjusting screw, the above problem of heat generation does not occur. However, although a height must be adjusted in an order of 0.1 μm, such a fine pitch could hardly be realized by an ordinary screw.

The present invention has for its object to provide a load measuring mechanism, in which the above mentioned problems can be solved and the positional deviation error can be adjusted by means of a mechanical error adjusting portion without working the load cell.

DISCLOSURE OF THE INVENTION

According to the invention, a load measuring mechanism comprising a load converting unit formed by a Roberval mechanism having a substrate portion and a load receiving portion coupled with the substrate portion by means of flexures, and a positional deviation error adjusting unit provided on a side of said load converting unit, wherein said positional deviation error adjusting unit is constructed to adjust the positional deviation error by applying a deviation force to a neighborhood of the flexure to adjust a height of the flexure.

BEST MODE OF THE INVENTION

Figure 1:
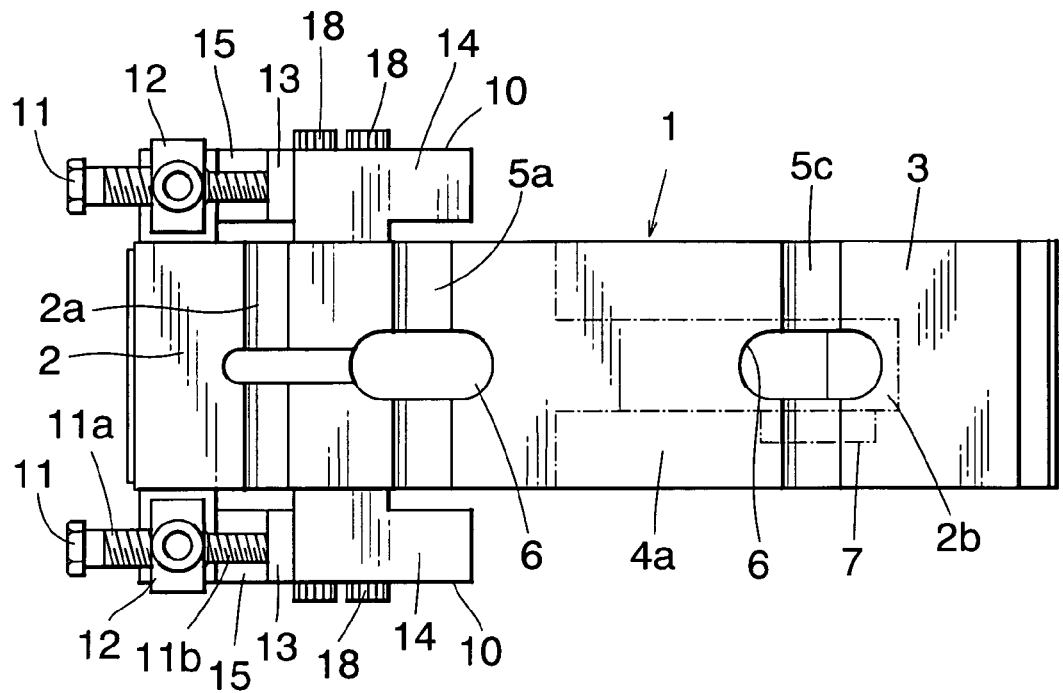
FIG. 1 is a plan view showing an embodiment of the load measuring mechanism according to the invention.

Now the present invention will be explained in detail with reference to an embodiment shown in the drawings.

Figure 2:
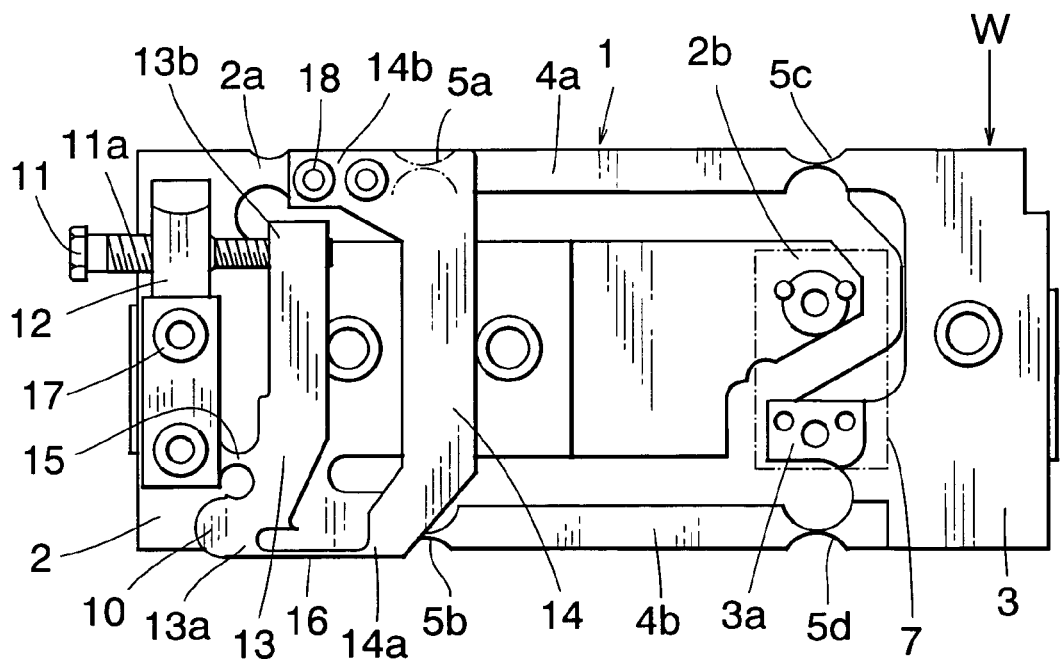
FIG. 2 is a side view thereof.
Figure 3:
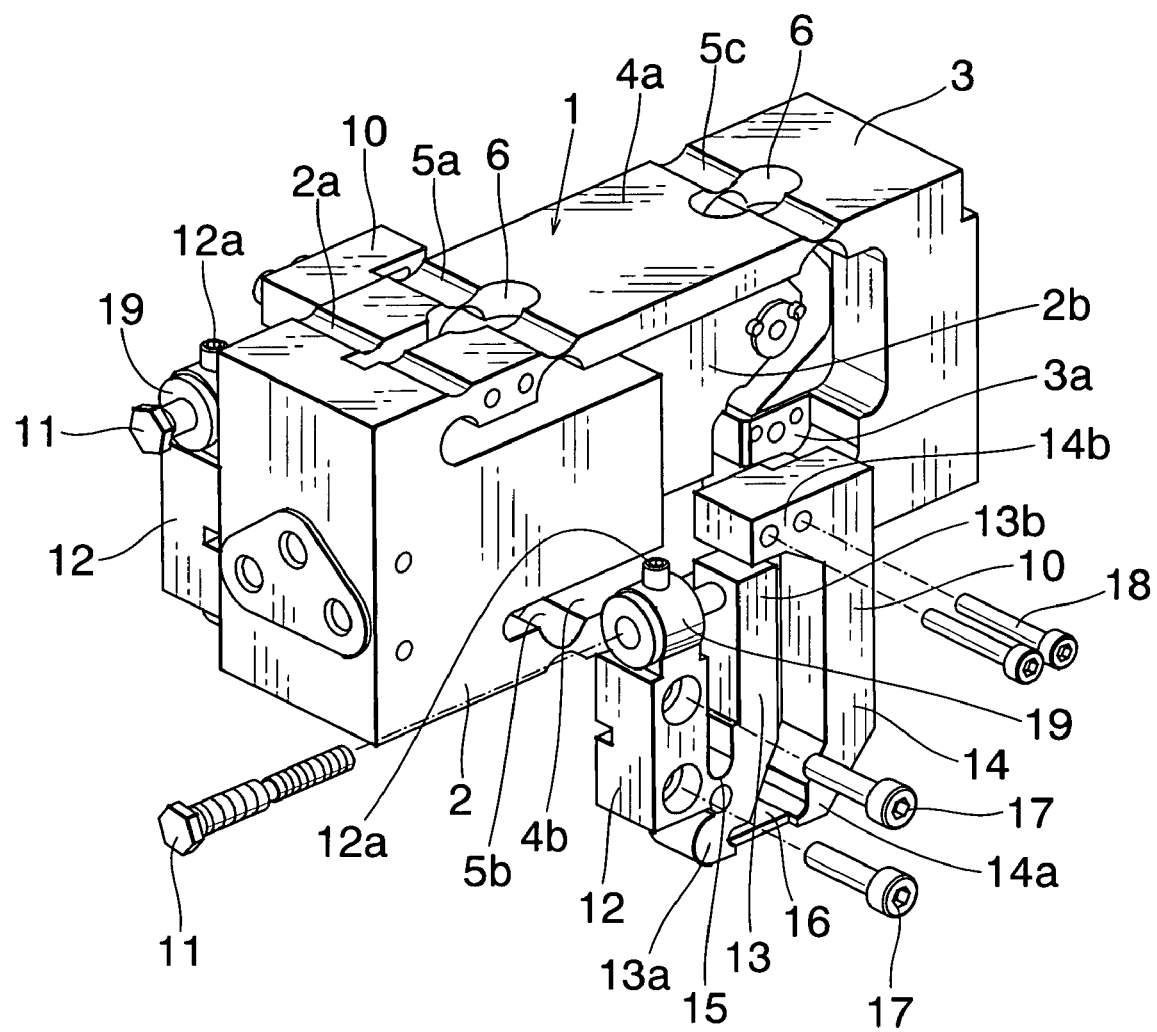
FIG. 3 is an exploded perspective view thereof.

FIGS. 1, 2 and 3 are a plan view, a side view and an exploded perspective view, respectively illustrating an embodiment of the load measuring mechanism according to the present invention. The load measuring mechanism comprises a load converting unit 1 formed by a Roberval mechanism 1 which is manufactured by cutting a single metal block into a given configuration. The Roberval mechanism 1 includes a substrate portion 2 and a load receiving portion 3 which is coupled with the substrate portion 2 by means of upper and lower parallel link portions 4a and 4b. The substrate portion 2 is coupled with the parallel link portions 4a, 4b via flexures 5a, 5b, and the parallel link portions 4a, 4b are coupled with the load receiving portion 3 via flexures 5c, 5d. In an upper portion of the substrate portion 2, there is provided a deformable portion 2a having a reduced thickness such that the deformable portion 2a can deform slightly. The flexure 5a is coupled with this deformable portion 2a. Each of the flexures 5a-5d and the deformable portion 2a have formed therein a through hole 6 such that an effective width of the flexure is narrowed.

A first load sensor fitting portion 2b is extended from the substrate portion 2 between the parallel link portions 4a and 4b up to a neighborhood of the load receiving portion 3. A second load sensor fitting portion 3a is extended from the load receiving portion 3 such that the second load sensor fitting portion 3a situates below the first load sensor fitting portion 2b. Between the first and second load sensor fitting portions 2b and 3a, is provided a load sensor 7 including a strain gauge or a tuning-fork type vibrating element. In the substrate portion 2 there are formed tapped holes for securing the substrate portion 2 to a base member not shown in the drawings. Moreover, the load receiving portion 3 has formed therein a tapped hole for securing a weighing pan not shown in the drawings.

On both sides of the substrate portion 2 there are provided positional deviation error adjusting portions 10 which operate independently from each other. Each of these positional deviation error adjusting portions 10 includes a base portion 12 and first and second levers 13 and 14, said base portion and levers being formed by cutting a single metal block. The positional deviation error adjusting portion 10 further includes adjusting bolt 11 and additional parts thereof.

The first lever 13 is coupled with the base portion 12 via a fulcrum 15. One end 13a of the first lever 13 is coupled with one end 14a of the second lever 14 by means of a thin flexible portion 16. The fulcrum 15 is provided at a position closer to the one end 13a of the first lever 13 such that a displacement of the other end 13b of the first lever 13 is transmitted to the one end 13a of the first lever 13 at a reduced scale.

The base portion 12 and the first and second levers 13 and 14 are arranged in parallel with each other in a direction perpendicular to a parallel direction of the parallel link portions 4a, 4b. The other end 13b of the first lever 13 is moved with respect to the base portion 12 by rotating the adjusting bolt 11. The base portion 12 is secured to the substrate portion 2 by means of fixing bolts 17, and the one end 14a and the other end 14b of the second lever 14 are secured to the side portion between the deformable portion 2a of the substrate portion 2 and the flexure 5a by means of fixing bolts 18.

Figure 4:
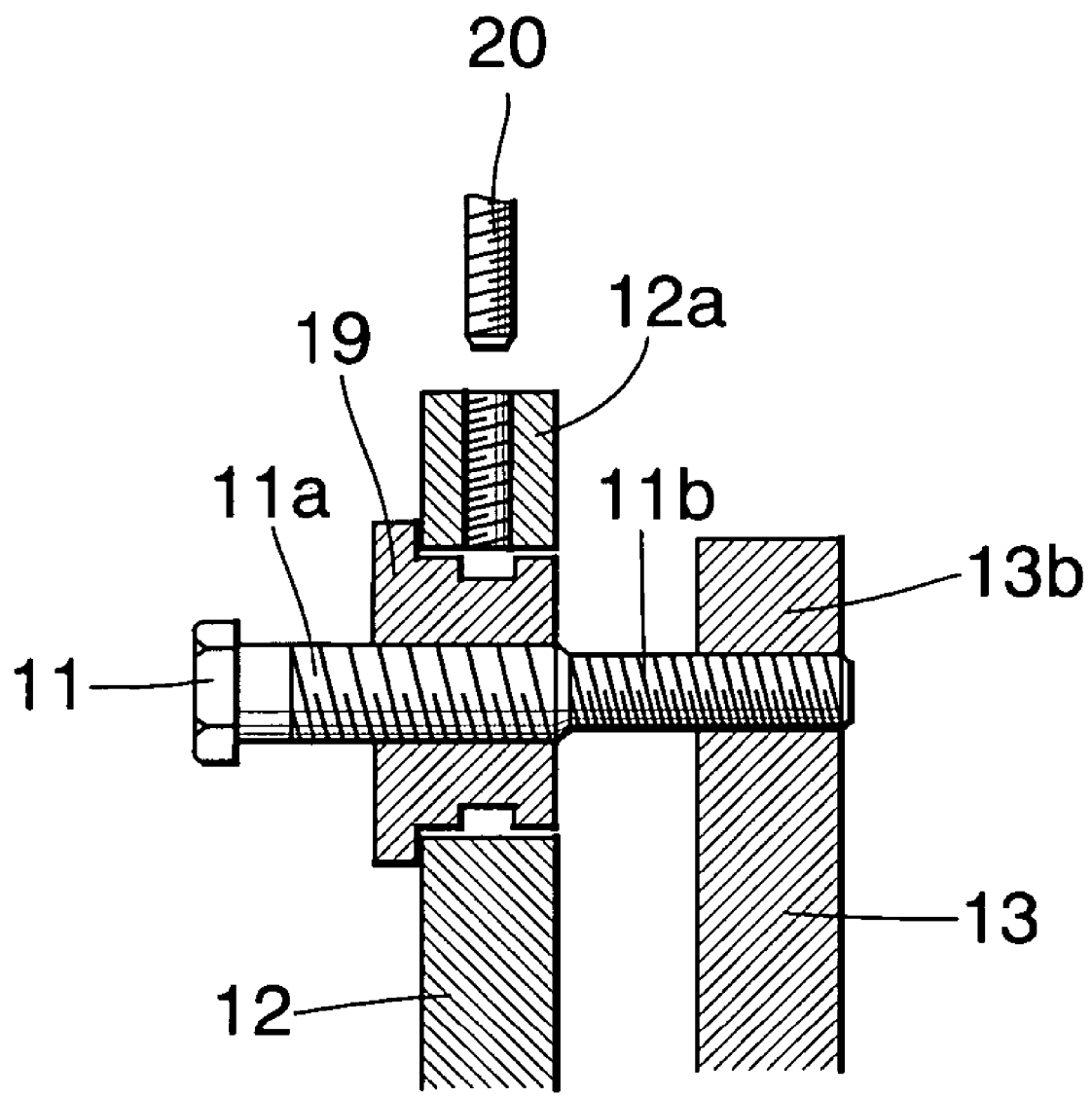
FIG. 4 is a cross sectional view illustrating a positional deviation error adjusting unit.

In order to finely adjust a displacement of the other end 13b of the first lever 13 with respect to the base portion 12, the adjusting bolt 11 is formed by a differential bolt. That is to say, as illustrated in FIG. 4, the adjusting bolt 11 includes a large diameter portion 11a which is screwed into the base portion 12 and a small diameter portion 11b which is screwed into the other end 13b of the first lever 13. A pitch of the small diameter portion 11b is smaller than a pitch of the large diameter portion 11a.

For the sake of assembling, the large diameter portion 11a is engaged with a nut portion 19 which is formed as a separate part from the base portion 12. At first, the large diameter portion 11a is screwed into the nut portion 19, and then the small diameter portion 11b is screwed into the first lever 13.

Then, the nut portion 19 is inserted into the base portion 12, and finally the nut portion 19 is secured to the base portion 12 by engaging a fixing screw 20 into a tapped hole 12a formed in the base portion 12 to extend in a direction perpendicular to an axial direction of the nut portion 19.

In the load measuring mechanism according to the invention, when a load W is applied to the load receiving portion 3 in a vertical direction via a weighing pan not shown, the load receiving portion 3 is moved downward and a parallel configuration formed by the parallel link portions 4a, 4b and substrate portion 2 is maintained by means of the Roberval mechanism including the flexures 5a-5d. An amount of the displacement of the load receiving portion 3 with respect to the substrate portion 2 is proportional to an amount of the applied load W, and thus the load W can be measured by the sensor 7.

If the positional deviation error is not adjusted in the load converting unit 1, there might be produced a positional deviation error depending upon a position at which the load W is applied on the weighing pan.

In the present embodiment, the positional deviation error is adjusted by means of a pair of the positional deviation error adjusting portions 10. That is to say, when the adjusting bolt 11 is rotated in such direction that a distance between the base portion 12 and the first lever 13 is increased, the first lever 13 is rotated about the fulcrum 15 to move the one end 13a of the first lever 13 toward the base portion 12. Then, this movement is transferred to the second lever 14 by means of the flexible portion 16 to move the one end 14a of the second lever 14 toward the base portion 12. Therefore, the other end 14b of the second lever 14 applies a deviation force to the flexure 5a to change a height of the flexure 5a.

In order to adjust the positional deviation error, it is sufficient to give a very small displacement to the flexure 5a. When the adjusting bolt 11 is rotated with respect to the nut portion 19, since the small diameter portion 11b of the adjusting bolt 11 has a smaller pitch than the large diameter portion 11a, the displacement of the other end 13b of the first lever 13 is limited to a small amount in comparison with the displacement of the adjusting bolt 11 with respect to the base portion 12. Moreover, since the displacement of the other end 13b of the first lever 13 is transferred to the one end 13a of the first lever 13 at a reduced scale depending on a ratio between a length from the other end 13b to the fulcrum 15 and a length from the fulcrum 15 to the one end 13a, a small displacement of the other end 13b of the first lever 13 is transferred to the second lever 14 via the flexible portion 16 as a further reduced displacement. In this manner, it is possible to adjust finely a height of the flexure 5a by slightly moving the other end 14b of the second lever 14.

In a manner mentioned above, the positional deviation error adjusting portion 10 converts a rotation of the adjusting bolt 11 into a very small displacement which is applied to the side portion of the flexure 5a. Then, a mechanical property of the load converting unit 1 is changed to adjust the positional deviation error. It is apparent that when the adjusting bolt 11 is rotated in an opposite direction, the positional deviation error can be adjusted in an opposite direction.

In the present embodiment, the positional deviation error adjusting portions 10 are provided on the both sides of the load converting unit 1 to apply the deviation force to both sides of the flexure 5a, but according to the invention, a single positional deviation error adjusting portion may be provided on only one side of the load converting unit.

Furthermore, the load converting unit 1 and positional deviation error adjusting portions 10 may be formed by cutting a single metal block. In the above explained embodiment, the load converting unit 1 and positional deviation error adjusting portions 10 are formed by cutting metal blocks, but according to the invention, the substrate portion 2, load receiving portion 3 and parallel link portions 4a, 4b may be formed by assembling separate members.

INDUSTRIAL APPLICABILITY

As explained above, in the load measuring mechanism according to the invention, the positional deviation error adjusting portion is arranged on a side of the load converting unit and a force is applied to a flexure of the Roberval mechanism from its side by means of the adjusting means to change a height of the flexure. In this manner, the positional deviation error can be adjusted.

What is claimed is:

1. A load measuring mechanism comprising a load converting unit formed by a Roberval mechanism having a substrate portion and a load receiving portion coupled with the substrate portion by means of flexures, and a positional deviation error adjusting unit provided on a side of said load converting unit for adjusting the positional deviation error by applying a deviation force to a neighborhood of a flexure to adjust a height of the flexure, wherein said positional deviation error adjusting portion includes a base portion, a first lever and a second lever, said first lever is coupled with said base portion by means of a fulcrum, a first end of the first lever is coupled with a first end of the second lever by means of a flexible portion, said base portion is secured to said substrate portion, a second end of the second lever opposite to said first end coupled with the flexible portion is secured to a neighborhood of said flexure, and said positional deviation error adjusting portion is constructed such that a distance between the base portion and a second end of the second lever opposite to said first end coupled with the flexible portion is changed by changing a distance between said base portion and said first lever.

2. The load measuring mechanism according to claim 1, wherein said load converting unit is formed by cutting a single metal block.

3. The load measuring mechanism according to claim 1, wherein said positional deviation error adjusting portion is formed by cutting a single metal block.

4. The load measuring mechanism according to claim 1, wherein said load converting unit and said positional deviation error adjusting portion are formed by cutting a single metal block.

5. The load measuring mechanism according to claim 1, wherein the distance between said base portion and said first lever is changed by a bolt.

6. The load measuring method according to claim 5, wherein said bolt is formed by a differential bolt.

7. The load measuring mechanism according to claim 1, wherein a pair of said positional deviation error adjusting portions are arranged on both sides of the load converting unit.

* * * * *